United States Patent [19]

Grego

[11] Patent Number: 4,930,853
[45] Date of Patent: Jun. 5, 1990

[54] ELECTROOPTIC DEFLECTOR

[75] Inventor: Giorgio Grego, Venaria, Italy

[73] Assignee: Cselt - Centro Studi E Laboratori Telecomunicazioni S.P.A., Turin, Italy

[21] Appl. No.: 384,642

[22] Filed: Jul. 24, 1989

[51] Int. Cl.$^5$ .......................... G02B 6/10; G02F 1/01
[52] U.S. Cl. ................................. 350/96.14; 350/356
[58] Field of Search ........... 350/355, 356, 96.11–96.14

[56] References Cited

U.S. PATENT DOCUMENTS

| 4,143,939 | 3/1979 | Desormiere et al. | 350/96.13 |
|-----------|--------|-------------------|-----------|
| 4,415,226 | 11/1983 | Verber et al. | 350/96.14 |
| 4,511,206 | 4/1985 | Thylen et al. | 350/96.11 |
| 4,738,502 | 4/1988 | Mikami et al. | 350/96.13 |
| 4,755,036 | 7/1988 | Suzuki et al. | 350/96.13 |

OTHER PUBLICATIONS

Acoustic Waves by Gordon S. Kino, Devices, Imaging & Analog Signal Processing, pub. Prentice–Hall Signal Processing Series. pp. 517–518.
Electrooptic Fresnel Lens-Scanner with an Array of Channel Waveguides by K. Takizawa, Applied Optics, vol. 22, No. 16, Aug. 15, 1983, pp. 2468–2473.

Primary Examiner—William L. Sikes
Assistant Examiner—Akm E. Ullah
Attorney, Agent, or Firm—Herbert Dubno

[57] ABSTRACT

An electrooptic deflector composed of a plate made of a material with a refractive index which can be modified by the application of an electrical field, whereinto a collimated optical beam can be injected in direction parallel to the electrodes deposited on a plate face. Said electrodes are parallel to one another, equally-spaced and separately connected to voltage sources apt to increase the refractive index in the material passing from an electrode to the next. The emerging optical beam is deflected in the direction wherein the refractive index increases.

2 Claims, 1 Drawing Sheet

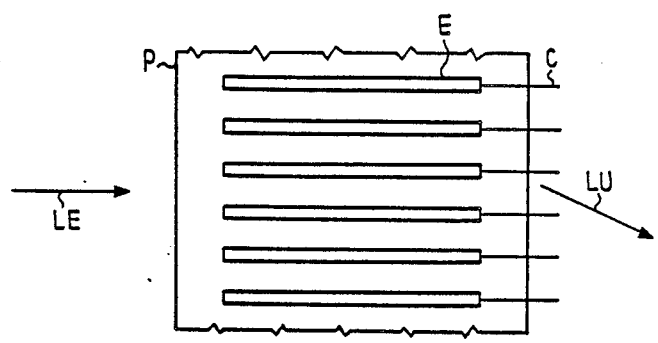

ELECTROOPTIC DEFLECTOR

FIELD OF THE INVENTION

The present invention relates to optical devices and more particularly to an electrooptic deflector.

BACKGROUND OF THE INVENTION

As known in a number of technical applications, the deflection of a collimated light-beam can be controlled by an electrical signal so as to illuminate preferential regions, as in printing machines or fixed-image reading machines, to modulate or switch optical signals, such as in equipment for optical fiber tranmission systems, to process signals in scientific apparatus, etc.

In the domain of digital telecommunications using light signals, particular performances in terms of deflection velocity are further required, e.g. in the implementation of switching circuits for high bit rate systems. The beam collimated at the input is to be kept, as far as possible, collimated at the output after deflection to avoid drawbacks, e.g., to avoid coupling losses with optical fibers whenever the beam is focused with an angle larger than the acceptance angle.

Finally, a deflection angle as large as possible is required especially when scanning large surfaces.

Nowadays, the most-widely used method of deflecting a light beam uses mirrors oriented by electrical motors. In case a continuous scanning is desired, mirrors are placed along the faces of a rotating prism. This method, however, does not always prove satisfactory because of the limited scanning frequency, which can be at the utmost a value of the order of some KHz, of mechanical complexity and of mechanical part wear, even though very large scanning angles are obtainable.

A more sophisticated technique handles an optical beam with acousto-optic means, (see page 517 of the book entitled "Acoustic waves", written by Gordon S. Kino, Prentice-Hall). In this case, a plane acoustic wave is launched into a crystal to cause a periodic structure of rarefaction and compression regions in the material. As a consequence a sequence of higher refractive-index zones alternated with lower-refractive index zones, wholly equivalent to a diffraction grating, is obtained. The light beam is launched into the crystal at a convenient angle with respect to the grating lines and at the output a reflected beam is obtained with an angle dependent on the acoustic signal wavelength. However, the deflection angles obtained are rather small. Typically they are of the order of a few degrees.

Devices operating on the basis of the electrooptical properties of some materials, such as lithium niobate, are also known. The article entitled "Electrooptic Fresnel lens-scanner with an array of channel waveguides," Applied Optics, Vol. 22, No. 16, 15 Aug. 1983, describes a Fresnel lens, obtained by deposition on a lithium niobate plate of conveniently-spaced electrodes alternately connected to two conductors. Refractive-index variations are obtained by applying a convenient potential difference, that is why the emerging beam, covering equivalent optical paths of different length, undergoes different phase variations. As a consequence, at the output regions the optical beams is focussed when the interference is constructive. Hence it is a lens.

Further electrooptic devices, e.g. as described in the U.S. Pat. No. 4,415,226, have a plate of electrooptic material with electrodes seperetely fed and connected to a control apparatus. In this case a Bragg grating is implemented, wherein the deflection angle of the outgoing beam a function of the input angle and of the grating spacing, which cannot be modified once the device has been fabricated, hence only two directions of the outgoing optical beam are possible.

OBJECT OF THE INVENTION

It is the object of the invention to obviate these disadvantages by an improved electrooptic deflector which allows a guided and collimated optical beam to be deflected of an angle of several tens of degrees, by keeping it collimated, with a considerable deflection velocity and without mechanical parts in movement.

The present invention provides an electrooptic deflector which comprises a plate of a material with a refractive index which may be modified by application of an electric field, with a first plane face into which a collimated optical beam is launched, a second plane face, parallel to the first, from which is deflected optical beam emerges and a third plane face, perpendicular to the first and second faces and such as to form a planar optical guide and on which electrodes are deposited. The collimated optical beam is sent in a direction parallel to the electrodes, which are parallel to one another and perpendicular to the first and second face, are separately connected to electrical conductors, connected in turn to voltage sources adapted to modify the refractive index of the material in increasing direction passing from an electrode to the next, so as to obtain parallel zones with proportionally increasing refractive indices, the outgoing optical beam being deflected in the direction wherein the refractive index increases.

Advantageously the voltage sources are processor controlled.

The sole FIGURE of the drawing schematically represents the electro-optic deflector in a plan view.

SPECIFIC DESCRIPTION

The deflector consists of a plate made of electrooptic material, namely a material whose refractive index can be modified by applying an electric field. An electric field capable of giving origin to periodic variations of refractive index, is applied to said material to obtain an operation similar to that of a phase diffraction grating. A material of this kind may be, e.g., lithium niobate.

As shown in the FIGURE, parallel and equally-spaced electrodes E, separately connected to electrical conductors C, are deposited on a plane face of plate P. A plane face, perpendicular to that containing the electrodes, allows the input of collimated optical beam LE into the guide and another plane face, parallel thereto, allows the output of deflected beam LU.

Each conductor C is connected to a voltage source, with a value permitting the generation in the crystal of parallel regions with a different, e.g. increasing or decreasing, refractive index. Thus an array of optical paths of different equivalent lengths (e.g. increasing or decreasing) can be obtained so as to form a phase grating.

Collimated optical beam LE is sent into this grating in direction parallel to the electrodes. As a consequence, the phase of the optical front of beam LU outgoing from the plurality of electrically-obtained "slits" created by the different refractive indices of successive regions controlled and such as to generate a constructive interference in the desired direction, analogously to what happens for synthetic aperture antennas. Of course, if the voltages applied are such as to provide equal refractive indices in all the optical paths, the outgoing beam LE will not be deflected.

Since the intensity of the electrical field I of the light beam is given by:

$$I = \left[\frac{\sin\left[N\left(\frac{\pi d \sin\phi}{\lambda} - \frac{\alpha}{2}\right)\right]}{N\sin\left[\frac{\pi d \sin\phi}{\lambda} - \frac{\alpha}{2}\right]}\right]^2$$

the parameters necessary to the deflector construction can be determined.

More particularly, N and d denote the electrode number and the spacing between. Quantity $\lambda$ is the optical wavelength and quantity $\alpha$, which is the phase difference between contiguous optical paths, is given by:

$$\alpha = \frac{2\pi l}{\lambda}(n_i - n_{i+1})$$

where:
l is the electrode length;
$n_i$ is the refractive index of the generic optical path or particular "slit" which is a, function of the voltage applied to the electrodes.

The voltages applied to the electrodes can be controlled by a microprocessor programmed to supply the most convenient values in function of the required deflection angle, which can attain values of some tens of degrees.

In case a deflection in one determined direction is required, the refractive indices should linearly increase in the same direction. To obtain this result, the electrical field E is to be incremented from one electrode to the next according to the relationship:

$$E = \frac{2\Delta n}{n^3 K}$$

where n is the refractive index and K a material-dependant electrooptic coefficient.

I claim:
1. An electrooptic deflector for deflection of a light beam over angles of tens of degrees, said electrooptic deflector comprising:
   an elongated plate composed of a material whose refractive index can be varied by application of an electric field thereto, said plate being formed with a first planar surface along one longitudinal side of said plate, a second planar surface along an opposite longitudinal side of said plate and a third planar surface between said first and second planar surfaces;
   a multiplicity of electrode strips deposited on said third planar surface and extending in mutually parallel transversely spaced relationship transverse to a longitudinal dimension of said plate in an array of sufficient length to effect said deflection of said light beam over angles of tens of degrees;
   voltage-source means connected to said electrode strips for applying voltages to said strips progressively increasing from one strip to a next strip selectively in a respective direction over the entire array, thereby forming in said material a multiplicity of parallel zones with refractive indices proportionally increasing in said direction over said array; and
   means for introducing a collimated optical beam into said plate through said first surface in a direction parallel to said electrode strips, whereby said collimated optical beam is deflected in said direction and emerges as an outgoing optical beam from said second surface.
2. The electrooptic deflector defined in claim 1 wherein said voltage-source means is processor controlled.

* * * * *